No. 615,528. Patented Dec. 6, 1898.
L. E. CLARK.
BICYCLE BRAKE.
(Application filed Nov. 13, 1897.)
(No Model.) 2 Sheets—Sheet 1.
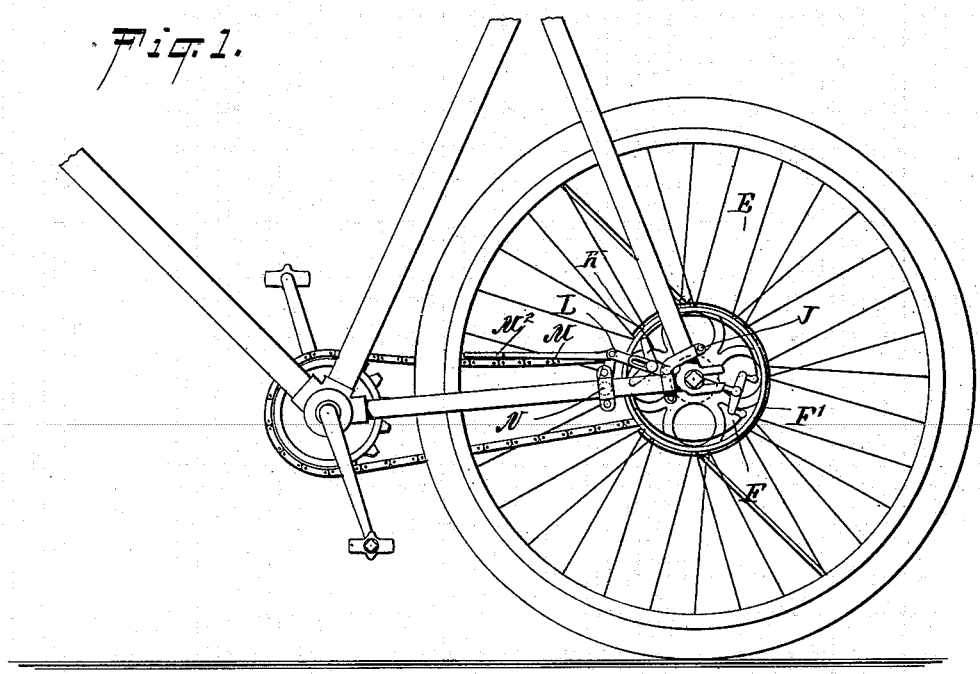
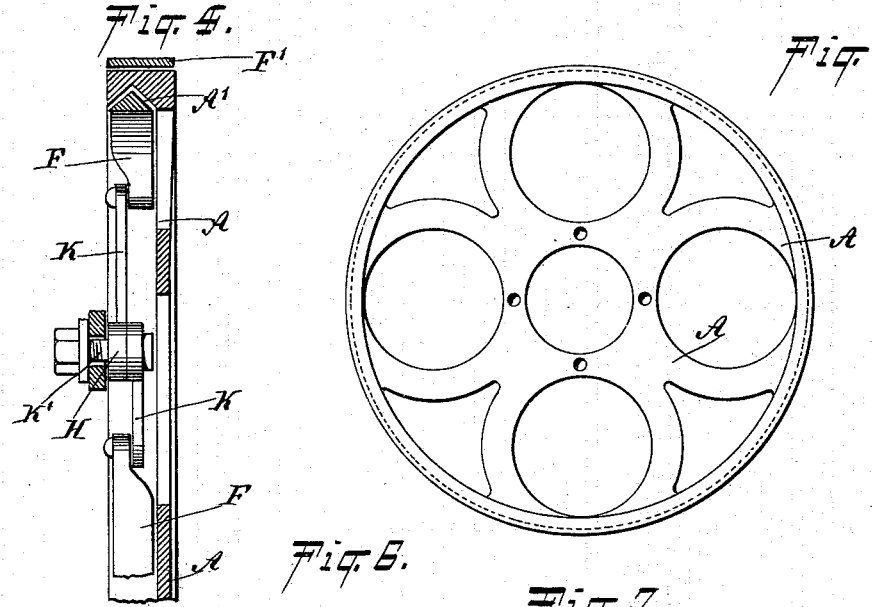
WITNESSES:
William P. Goebel.
John Litka.
INVENTOR
L. E. Clark
BY
ATTORNEYS.

No. 615,528. Patented Dec. 6, 1898.
L. E. CLARK.
BICYCLE BRAKE.
(Application filed Nov. 13, 1897.)
(No Model.) 2 Sheets—Sheet 2.
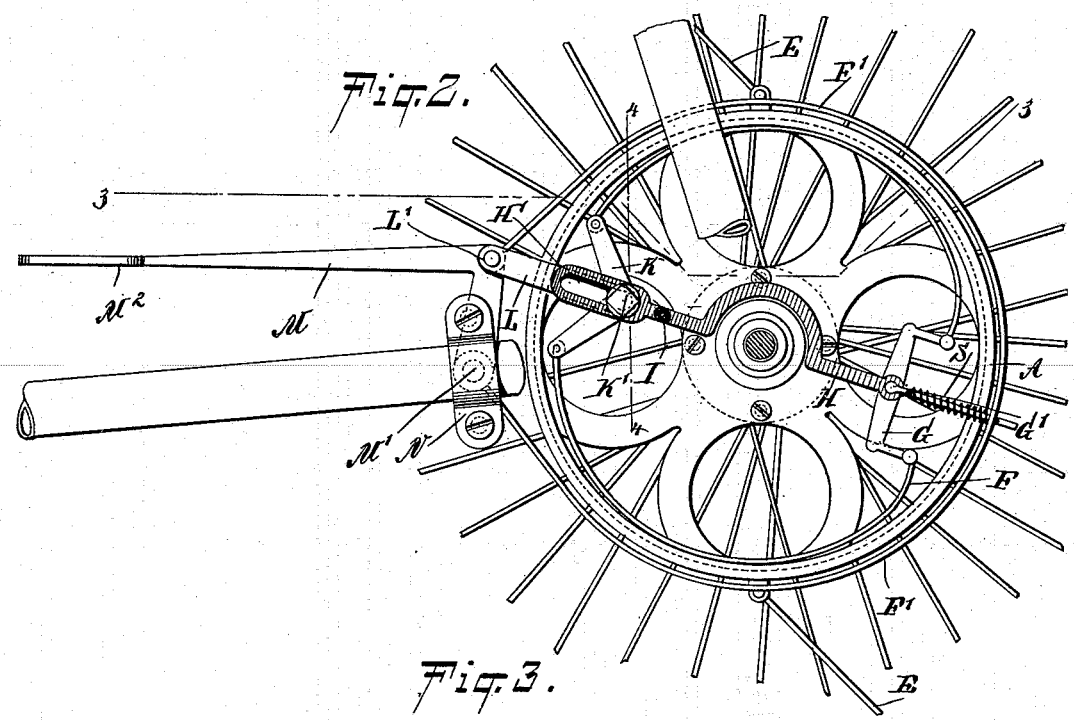
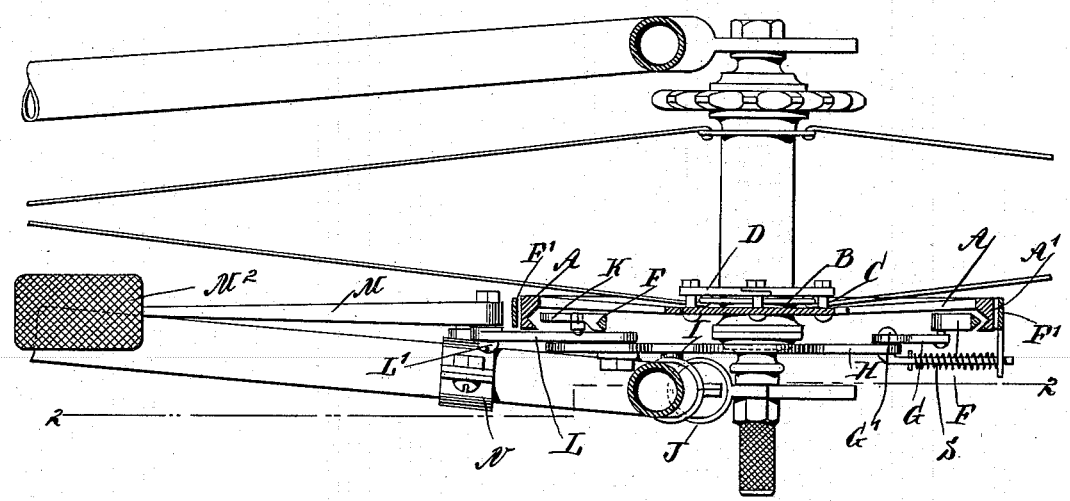
WITNESSES:
William P. Goebel
John Lotka
INVENTOR
L. E. Clark
BY
ATTORNEYS.

UNITED STATES PATENT OFFICE.

LOREN E. CLARK, OF SHENANDOAH, PENNSYLVANIA.

BICYCLE-BRAKE.

SPECIFICATION forming part of Letters Patent No. 615,528, dated December 6, 1898.

Application filed November 13, 1897. Serial No. 658,404. (No model.)

*To all whom it may concern:*

Be it known that I, LOREN E. CLARK, of Shenandoah, in the county of Schuylkill and State of Pennsylvania, have invented a new and Improved Bicycle-Brake, of which the following is a full, clear, and exact description.

My invention relates to brakes for bicycles or other vehicles, and has for its object to provide a powerful brake which will have a large effective surface within a comparatively small space and which will be readily operated and readily adapted to a bicycle of ordinary construction.

The invention will be fully described hereinafter and the features of novelty pointed out in the appended claims.

Reference is to be had to the accompanying drawings, forming a part of this specification, in which similar characters of reference indicate corresponding parts in all the views.

Figure 1 is a partial side elevation of a bicycle, showing my improved brake applied thereto. Fig. 2 is a longitudinal section of the brake mechanism on the line 2 2 of Fig. 3. Fig. 3 is a sectional plan thereof on the line 3 3 of Fig. 2. Fig. 4 is a sectional elevation on the line 4 4 of Fig. 2, and Figs. 5, 6, and 7 are details of the brake-wheel and its fastening.

In carrying out my invention I secure to the hub of one of the wheels, (the rear wheel,) as shown, a brake-wheel or brake-disk A, which may be secured to the ordinary flange B of the hub by means of the bolts C and a divided plate D, such as shown in Figs. 6 and 7.

In order to take off most of the strain from the hub of the wheel and to transfer such strain to the rim, I secure to the brake-wheel A two or more spokes E, connecting it with the rim, said spokes being approximately tangent spokes. (See Figs. 1 and 2.) It will be observed that these spokes extend in the opposite direction to the ordinary spokes connecting the hub to the rim—that is, while said main spokes extend somewhat forwardly from the hub to the rim at the lower part of the hub the auxiliary spokes E extend rearwardly from the lower part of the brake-wheel A to the rim, so that they will be subjected to a tension strain when the wheel A is engaged by the brake. The brake-wheel A has a flange with an interior groove A', the groove being preferably of V shape, as shown. Into this groove are adapted to project segmental brake-bands F of a cross-section corresponding to the interior of the grooves. One end of each brake-band F is secured to a link G, each of which is pivoted at G' upon a bracket H, carried by a stud I, which is secured to the frame of the wheel by means of a double clamp J. (See Figs. 1 and 3.) The other end of each brake-band F is secured to a link K, pivoted upon a bolt K', which is adapted to slide radially in a slot H' of the bracket H. The bolt K' is carried by a link L, which is pivotally connected at L' with an actuating-lever M, fulcrumed at M' upon a clamp N, secured upon the frame of the bicycle. The brake-wheel A is surrounded by a brake-band F', one end of which is fastened to the frame—for instance, at M'—while the other end is secured to the lever M—for instance, at L'. The lever M may be a foot-lever, being for this purpose provided with a foot-plate, as shown at $M^2$, or a connection may be made whereby the lever M may be actuated by hand, such constructions being well known.

The brake-bands are made of spring-steel or like elastic material, so that as long as no pressure is exerted on the lever M both bands are thrown off the brake-wheel A. When, however, the lever M is depressed, the outer brake-band F' obviously is drawn into engagement with the flange of the brake-wheel, and at the same time the link L pulls the bolt K' outward, throwing the links K out by toggle action, so that the inner brake-band segments F also come in engagement with the brake-wheel. It will be seen that the length of the effective brake-surface is equal to about one and one-half times the periphery of the brake-wheel. Thus a very powerful action is obtained. As soon as the lever M is released the elasticity of the brake-bands will restore the parts to their original position, the revolving brake-wheel assisting this movement of parts. To assist in keeping the brake-band F' off the friction-wheel A, I may attach a spring S to a stationary part, such as the pivot G', said spring passing around the flange of the friction-wheel so as to clear it and being attached at its outer end to the said brake-band F'.

I desire it to be understood that I do not limit myself to the exact details of construction shown, but that various modifications may be made within the scope of the appended claims.

Having thus described my invention, I claim as new and desire to secure by Letters Patent—

1. The combination of the rotatable brake-wheel, the stationary bracket having an approximately radial guideway, a bolt mounted to move in said guideway, actuating mechanism connected to said bolt, brake-bands arranged to engage opposite halves of the brake-wheel, toggle-links connecting said bolt with one end of each brake-band, and means for holding the other end of each brake-band relatively stationary, substantially as described.

2. The combination of the rotatable brake-wheel, the stationary bracket having an approximately radial guideway, a bolt mounted to move in said guideway, actuating mechanism connected to said bolt, brake-bands arranged to engage opposite halves of the brake-wheel, toggle-links connecting said bolt with one end of each brake-band, and a link pivoted to some stationary part on the opposite side of the wheel's center to the bolt, the other end of each brake-band being attached to said link, substantially as described.

3. The combination of a vehicle-wheel, the brake-wheel secured to the central portion thereof, said brake-wheel having a flange with an interior groove, interior brake-bands of a cross-section corresponding to that of the groove, a stationary bracket having an approximately radial guideway, a bolt mounted to move in said guideway, toggle-links connecting the bolt to the brake-band, and an actuating mechanism connected to said bolt, substantially as described.

LOREN E. CLARK.

Witnesses:
  MICHAEL MELLET,
  MICHAEL D. MALONE.